(12) United States Patent
Volftsun (10) Patent No.: US 11,192,770 B1
(45) Date of Patent: Dec. 7, 2021

(54) SELF SERVE BEVERAGE BY THE GLASS

(71) Applicant: Sestra Systems, Sterling, VA (US)

(72) Inventor: Lev Volftsun, Sterling, VA (US)

(73) Assignee: Sestra Systems, Sterling, VA (US)

( * ) Notice: Subject to any disclaimer, the term of this patent is extended or adjusted under 35 U.S.C. 154(b) by 0 days.

(21) Appl. No.: 17/027,758

(22) Filed: Sep. 22, 2020

Related U.S. Application Data (63) Continuation-in-part of application No. 15/935,421, filed on Mar. 26, 2018, now abandoned, and a
(Continued)

(51) Int. Cl.
| | |
|---|---|
| *B67D 1/00* | (2006.01) |
| *G06Q 20/18* | (2012.01) |
| *G06Q 50/12* | (2012.01) |
| *G06Q 30/06* | (2012.01) |
| *G06Q 20/04* | (2012.01) |
| *G06Q 10/10* | (2012.01) |
| *G06Q 20/20* | (2012.01) |
| *G07F 13/06* | (2006.01) |
| *G07F 13/10* | (2006.01) |
| *G06K 7/10* | (2006.01) |
| *G06K 7/14* | (2006.01) |

(Continued)

(52) U.S. Cl.
CPC ......... *B67D 1/0041* (2013.01); *B67D 1/0888* (2013.01); *G05B 19/042* (2013.01); *G06K 7/1097* (2013.01); *G06K 7/10297* (2013.01); *G06K 7/10415* (2013.01); *G06K 7/1417* (2013.01); *G06Q 10/10* (2013.01); *G06Q 20/047* (2020.05); *G06Q 20/18* (2013.01); *G06Q 20/202* (2013.01); *G06Q 20/204* (2013.01); *G06Q 20/209* (2013.01); *G06Q 30/0607* (2013.01); *G06Q 50/12* (2013.01); *G07F 13/065* (2013.01); *G07F 13/10* (2013.01); *G05B 2219/2645* (2013.01)

(58) Field of Classification Search
CPC .......................... G07F 13/065; B67D 1/0041
USPC .......................................................... 222/52
See application file for complete search history.

(56) References Cited

U.S. PATENT DOCUMENTS

| | | | | |
|---|---|---|---|---|
| 928,588 A | * | 7/1909 | Cornish | ............... B67D 1/0084 222/144.5 |
| 1,144,583 A | * | 6/1915 | Brown | .................... G01F 11/04 222/249 |

(Continued)

*Primary Examiner* — Paul R Durand
*Assistant Examiner* — Michael J. Melaragno
(74) *Attorney, Agent, or Firm* — Gugliotta & Gugliotta, LPA (57) ABSTRACT

Automated dispensing of beverages is provided by unattended software control. Grants are purchased or given from the administrative Portal (we call it Pass Manager, see screen shots in the ppt presentation). The redemption is initiated from the web page opened on a phone or tablet. Redemption can also be initiated by applying QR, bar code, RFID or CC cards to a Reader. dispensing tap may be accessed at the dispensing station interface or via a networked application interface. Authenticating the granting of automated access via a receipt includes acceptance of legal terms and conditions and assess limited by an access code. User may prepay for servings, with the tap remaining locked until the user specific access code is acknowledged. After dispensing, the tap is locked and the purchase or grant total updated.

8 Claims, 11 Drawing Sheets

Related U.S. Application Data continuation-in-part of application No. PCT/US2018/013415, filed on Jan. 11, 2018, and a continuation-in-part of application No. 15/869,028, filed on Jan. 11, 2018, now Pat. No. 10,294,093, and a continuation-in-part of application No. 15/487,488, filed on Apr. 14, 2017, now Pat. No. 9,926,181, and a continuation-in-part of application No. 15/424,478, filed on Feb. 3, 2017, now Pat. No. 10,167,183, said application No. 15/487,488 is a continuation-in-part of application No. 15/332,117, filed on Oct. 24, 2016, now Pat. No. 10,294,092, and a continuation-in-part of application No. 14/686,820, filed on Apr. 15, 2015, now Pat. No. 10,125,002.

(51) Int. Cl.
  *G05B 19/042* (2006.01)
  *B67D 1/08* (2006.01)

(56) References Cited

U.S. PATENT DOCUMENTS

| | | | | |
|---|---|---|---|---|
| 1,904,829 A * | 4/1933 | Hurlbrink | B67D 7/166 | 222/47 |
| 3,216,627 A * | 11/1965 | Best | B67D 1/12 | 222/249 |
| 3,344,667 A * | 10/1967 | Maltby | G01F 3/16 | 73/239 |
| 3,370,759 A * | 2/1968 | Johansson | B67D 1/104 | 222/249 |
| 3,530,873 A * | 9/1970 | Arp | A61M 16/12 | 137/99 |
| 3,552,606 A * | 1/1971 | Kraft | G01F 11/04 | 222/249 |
| 3,565,287 A * | 2/1971 | Johnston | G01F 11/04 | 222/26 |
| 3,612,360 A * | 10/1971 | Ambrose | F04B 53/14 | 222/340 |
| 3,776,252 A * | 12/1973 | Wilcox | G05D 9/12 | 137/99 |
| 3,830,405 A * | 8/1974 | Jaeger | B67D 1/103 | 222/129.3 |
| 3,831,821 A * | 8/1974 | Doyen | B65B 3/32 | 222/255 |
| 3,870,089 A * | 3/1975 | Laub, III | B67C 3/206 | 141/44 |
| 4,240,291 A * | 12/1980 | Andersson | G01P 5/18 | 73/239 |
| 4,304,736 A * | 12/1981 | McMillin | B67D 1/0073 | 261/35 |
| 4,386,716 A * | 6/1983 | Buck | G05D 11/001 | 222/134 |
| 4,491,248 A * | 1/1985 | Blackwell | G01F 11/04 | 222/249 |
| 4,501,144 A * | 2/1985 | Higashi | G01F 1/698 | 73/204.26 |
| 4,638,924 A * | 1/1987 | Newsom | A01C 23/042 | 137/106 |
| 4,661,321 A * | 4/1987 | Byrd | B01F 3/088 | 222/249 |
| 4,736,873 A * | 4/1988 | Patriquin | B67D 1/104 | 137/625.6 |
| 4,831,866 A * | 5/1989 | Forkert | B67D 7/085 | 700/283 |
| 4,927,567 A * | 5/1990 | Rudick | B01F 3/04269 | 261/104 |
| 4,967,936 A * | 11/1990 | Bingler | B67D 1/0031 | 222/129.2 |
| 5,381,926 A * | 1/1995 | Credle, Jr. | B67D 1/0032 | 222/1 |
| 5,452,610 A * | 9/1995 | Kleinhans | G01F 1/6845 | 73/204.25 |
| 5,829,633 A * | 11/1998 | Emmerich | G01F 11/16 | 222/1 |
| 6,672,481 B2 * | 1/2004 | Ziesel | B67D 1/0007 | 222/129.1 |
| 7,032,780 B2 * | 4/2006 | Crisp, III | B67D 1/0057 | 222/129.1 |
| 7,032,818 B2 * | 4/2006 | Thomas | B67D 1/0888 | 235/381 |
| 7,716,963 B2 * | 5/2010 | Bell | G01F 25/0007 | 73/1.34 |
| 7,803,321 B2 * | 9/2010 | Lark | B01F 15/0425 | 422/62 |
| 8,162,175 B2 * | 4/2012 | Gardner, Jr. | G06Q 10/08 | 222/1 |
| 8,479,955 B2 * | 7/2013 | Vesborg | B67D 1/0082 | 222/146.6 |
| 8,739,598 B2 * | 6/2014 | Uebel | B25J 9/1692 | 73/1.79 |
| 8,746,507 B2 * | 6/2014 | Metropulos | B67D 1/0888 | 222/129.1 |
| 8,751,037 B2 * | 6/2014 | Peters | G07F 9/002 | 700/236 |
| 9,092,768 B2 * | 7/2015 | Breitenbach | G06Q 30/0277 | |
| 9,152,956 B1 * | 10/2015 | Habash | G07B 15/00 | |
| 9,366,557 B2 * | 6/2016 | Soreefan | G01F 1/68 | |
| 9,371,219 B2 * | 6/2016 | Metropulos | B67D 1/0888 | |
| 9,569,748 B2 * | 2/2017 | Peters, Jr. | G06Q 10/087 | |
| 9,633,504 B2 * | 4/2017 | Kline | G07F 11/62 | |
| 10,059,581 B2 * | 8/2018 | Peters | G06K 7/10009 | |
| 10,319,001 B2 * | 6/2019 | Kline | G06Q 30/0282 | |
| 10,492,513 B1 * | 12/2019 | Sullivan | B01F 13/1055 | |
| 2001/0039969 A1 * | 11/2001 | Needham | F16K 27/041 | 137/628 |
| 2002/0113087 A1 * | 8/2002 | Ziesel | B67D 1/0007 | 222/129.1 |
| 2003/0006281 A1 * | 1/2003 | Thomas | G07F 13/065 | 235/385 |
| 2004/0076215 A1 * | 4/2004 | Baumbach | G01K 7/42 | 374/29 |
| 2004/0261520 A1 * | 12/2004 | Letters | G01F 1/6847 | 73/204.26 |
| 2006/0118581 A1 * | 6/2006 | Clark | B01F 13/1066 | 222/333 |
| 2007/0272742 A1 * | 11/2007 | Gosi | G07F 13/025 | 235/381 |
| 2008/0004973 A1 * | 1/2008 | Rothschild | G06Q 30/0613 | 705/14.46 |
| 2008/0189078 A1 * | 8/2008 | Vok | B67D 1/0842 | 702/188 |
| 2008/0202148 A1 * | 8/2008 | Gagliano | B67D 1/1405 | 62/392 |
| 2009/0013753 A1 * | 1/2009 | Bell | G01F 1/8436 | 73/1.16 |
| 2009/0069930 A1 * | 3/2009 | Peters | G06Q 10/087 | 700/236 |
| 2009/0069947 A1 * | 3/2009 | Newman | B67D 1/0888 | 700/281 |
| 2009/0101233 A1 * | 4/2009 | Owens | B67D 1/0041 | 141/369 |
| 2009/0125457 A1 * | 5/2009 | Farhan | B67D 1/0007 | 705/413 |
| 2010/0089943 A1 * | 4/2010 | Till | B67D 3/0006 | 222/1 |
| 2011/0168775 A1 * | 7/2011 | Van Zetten | B67D 1/0888 | 235/381 |
| 2011/0173082 A1 * | 7/2011 | Breitenbach | G06Q 30/0601 | 705/16 |
| 2012/0158173 A1 * | 6/2012 | Metropulos | G07F 13/065 | 700/236 |
| 2013/0253872 A1 * | 9/2013 | Curtis | G01F 25/0007 | 702/100 |
| 2014/0209634 A1 * | 7/2014 | Metropulos | B67D 1/06 | 222/129.1 |
| 2014/0284349 A1 * | 9/2014 | Metropulos | B67D 1/0888 | 222/23 |

(56) References Cited

U.S. PATENT DOCUMENTS

| | | | |
|---|---|---|---|
| 2014/0372233 A1* | 12/2014 | Knecht | G06Q 30/0635 |
| | | | 705/15 |
| 2015/0027665 A1* | 1/2015 | Cooke | F28F 27/02 |
| | | | 165/96 |
| 2015/0122130 A1* | 5/2015 | Wunder | B67D 1/0041 |
| | | | 99/277 |
| 2015/0144650 A1* | 5/2015 | Kline | G07F 13/065 |
| | | | 222/1 |
| 2015/0344284 A1* | 12/2015 | Perkins | B67D 1/0037 |
| | | | 222/1 |
| 2016/0052770 A1* | 2/2016 | Ratti | B25J 11/008 |
| | | | 705/15 |
| 2016/0090288 A1* | 3/2016 | Givens, Jr. | B67D 1/0888 |
| | | | 700/283 |
| 2016/0257549 A1* | 9/2016 | Volftsun | B67D 1/0007 |
| 2017/0096322 A1* | 4/2017 | Volftsun | B67D 1/0007 |
| 2017/0099981 A1* | 4/2017 | Haidar | G07F 13/10 |
| 2017/0213260 A1* | 7/2017 | Kline | G07F 11/62 |
| 2018/0330565 A1* | 11/2018 | Koretz | G06Q 20/18 |
| 2018/0362322 A1* | 12/2018 | Peters | G07F 9/002 |
| 2019/0276297 A1* | 9/2019 | Tewari | B67D 1/0053 |
| 2020/0255277 A1* | 8/2020 | Stubbs | G07F 13/065 |
| 2020/0288907 A1* | 9/2020 | Braje | B67D 1/0888 |

* cited by examiner

Welcome to Sestra Portal!

Admin / Congressional

SESTRA SMART DISPENSING

- ⊞ Dashboard Coming Soon!
- ⏵ Analytics
- ✧ My Configuration Coming Soon!
- ☐ Customers
- ☐ Venues
- ▨ Devices
- $ Billing
- ⏵ ⚙ Admin
  - Users
  - Self Service
  - Congressional ⏵
- ⏷ ☰ Beverages
- ⏷ ✦ Settings
- ⏷ ⓘ Support
- ✉ Contact Us ⇦ Log out

| Member ID | E-Mail | First name | Last name | +Add |
|---|---|---|---|---|

| Member ID | First name | Last name | E-Mail | Balance | Actions |
|---|---|---|---|---|---|
| 342522 | John | Doe | jdoe@aol.com | 7 | ⟩ ⊞ |
| 312454 | Bob | Smith | bsmith@abc.com | 11 | ⟩ ⊞ |
| 342522 | John | Doe | jdoe@aol.com | 7 | ⟩ ⊞ |
| 312454 | Bob | Smith | bsmith@abc.com | 11 | ⟩ ⊞ |
| 342522 | John | Doe | jdoe@aol.com | 7 | ⟩ ⊞ |
| 312454 | Bob | Smith | bsmith@abc.com | 11 | ⟩ ⊞ |
| 342522 | John | Doe | jdoe@aol.com | 7 | ⟩ ⊞ |
| 312454 | Bob | Smith | bsmith@abc.com | 11 | ⟩ ⊞ |
| 312454 | Bob | Smith | bsmith@abc.com | 11 | ⟩ ⊞ |
| 342522 | John | Doe | jdoe@aol.com | 7 | ⟩ ⊞ |
| 312454 | Bob | Smith | bsmith@abc.com | 11 | ⟩ ⊞ |

SESTRA
SMART DISPENSING

Welcome to Sestra Portal! ⮐ Log out

Admin / Congressional

| | | | |
|---|---|---|---|
| Member ID | E-Mail | First name | Last name |
| | | | |

- ⊞ Dashboard Coming Soon!
- ⎍ Analytics
- ✧ My Configuration Coming Soon!
- ☐ Customers
- ☐ Venues
- ⚙ Devices
- $ Billing
- ⚙ Admin
  - Users
  - Self Service
  - Congressional ›
- ▽ Beverages ⌄
- ✿ Settings ⌄
- ⊙ Support
- ✉ Contact Us

| Member ID | First name | Last name | E-Mail | Balance | Pin | Actions |
|---|---|---|---|---|---|---|
| 342522 | Jo | | | | 1234 | › ⊞ |
| 312454 | Bo | | | | 2456 | › ⊞ |
| 342522 | Jo | | | | 1234 | › ⊞ |
| 312454 | Bo | | | | 2456 | › ⊞ |
| 342522 | Jo | | | | 1234 | › ⊞ |
| 312454 | Bo | | | | 2456 | › ⊞ |
| 342522 | Jo | | | | 1234 | › ⊞ |
| 312454 | Bo | | | | 2456 | › ⊞ |
| 342522 | John | Doe | jdoe@aol.com | 7 | 1234 | › ⊞ |
| 312454 | Bob | Smith | bsmith@abc.com | 11 | 2456 | › ⊞ |

+Add

‹ ‹ 1 2 › ›

Grant Allowance

User: Bob Smith
Member ID: 276763
PIN: 4325
Number of servings: 24

🖶 Print                Cancel  Save

August 31, 2017        Wine by the Glass Receipt

Member First Name, Last Name

Wine Servings:    10

Wine PIN:         xxxxxxx

Wine can be redeemed at the wine by the Glass station in theTennis Club.

Insert Legal terms & conditions, seving to minor disclaimer and acceptance language here.

SELF SERVE BEVERAGE BY THE GLASS

RELATED APPLICATIONS

The present invention is a Continuation in Part of U.S. patent application Ser. No. 15/332,117, filed on Oct. 24, 2016 as a Continuation in Part of U.S. Pat. No. 10,125,002, filed on Apr. 15, 2015, and claiming priority of U.S. Provisional Application 62/023,899 filed on Jul. 13, 2014. The present invention is also a Continuation in Part of U.S. patent application Ser. No. 15/869,028 filed on Jan. 11, 2018, also as a Continuation in Part of U.S. Pat. No. 10,125,002 filed on Apr. 15, 2015. The present invention is also a Continuation in Part of U.S. patent application Ser. No. 15/332,117 filed on Oct. 24, 2016 which is also a Continuation in Part of U.S. Pat. No. 10,125,002. All Related References are incorporated by reference as if fully rewritten herein.

BACKGROUND OF THE INVENTION

1. Field of the Invention

The present invention relates to a system and method for the automated, controlled, metered and reported dispensing bulk, pressurized beverages and, more particularly, to such a system and method that facilitates controlled self dispensing therefrom.

2. Description of the Related Art

"Happy hour" is a marketing term for a time when venue (such as a restaurant, bar, hotel, private club, etc.) offers complimentary or discounted alcoholic drinks. Free appetizers and discounted menu items are often served during happy hour. The concept has accelerated as morale and team building events are on the rise at many places of employment and coworking spaces, with regular after-work events being provided to facilitate social interaction or a culture of collaboration.

However, beer and wine contain alcohol, and as such are carefully regulated and their distribution carefully controlled. Normally, a human gatekeeper (i.e. bartender) is provided for safety and control and to monitor Dram Shop rules, statutes or case law which imposes strict liability to anyone injured by the drunken patron or guest on a business which sells alcoholic drinks or a host who serves liquor.

For these and other reasons, private business and clubs have limitations on providing such perks, whether the cost of providing a bartender or the logistics of controlling inventory or consumption. Consequently, a system and method for providing an automated and controlled self dispensing of beer or wine would be beneficial and solve a number of long felt needs in this field.

SUMMARY OF THE INVENTION

It is thus an object of the present invention to provide a system for providing self serve beverage by the glass through controlled self dispensing.

It is features of the present invention to provide for automated control, monitoring and reporting of single serve dispensing of beer, wine, cocktail, or other beverage from a bulk dispensing system.

The present invention provides a system and method for dispensing and controlling a pour for a regulated beverage. A bulk storage and distribution system provides a metering mechanism in fluid communication with a beverage supply and in operative connection with the bulk storage and distribution system. The metering system provides a specific selected volumetric discharge in fluid communication with a tap or spigot in a manner that provides for said beverage to be discharged in a controlled and metered manner. A controller operates the metering mechanism, and an electronic interface accesses and initiates the controller. The electronic interface allows a purchase or grant of one or more single servings of a beverage, and redemption of the servings are controlled from an automated dispensing tap in fluid communication with the metering mechanism. The dispensing tap may be accessed at the dispensing station interface or via a networked application interface.

Allocation of purchases or grants are provided by a controlled facilitator that grants subsequent automated access servings from the purchase or grant. Authenticating the granting of automated access is accomplished via a receipt comprising legal terms and conditions and an access code, with activation of the automated dispensing tap secured by the access code prior to dispensing. Printed receipts and the us of a PIN is one particular authentication mechanism; however, additional solutions are anticipated for use where a customer authenticates the guest, or otherwise confirms that they are over a necessary legal age to purchase alcohol, such as having a customer staff confirm that a guest is of the legal drinking age and issue them a PIN. A guest then enters this PIN from a computer or credit card reader terminal and only after that this guest is allowed to proceed with the redemption or purchase of an alcoholic beverage. In several implementations guest ID's may be stored in the a remote database, and either loaded there in bulk or entered from an online portal so that redemption attempts may be authenticated against this database The tap is then automatically locked after dispensing, with the balances of purchases or grants being updated and decremented, thereby tracking the number servings, volume dispensed or dollar amount spent.

It is an advantage of the present invention to serve beverage by the glass in a controlled manner.

It is another advantage of the present invention to allow for automated self serve beverage dispensing via a network enabled pre-allocated or pre-purchased control mechanism. It should be mentioned that we could issue servings grant per beverage category, e.g. 5 servings of beer and 10 servings of wine.

Further advantages of the present invention to control such automated beverage dispensing in a managed, monitored and controlled manner such that dispensing taps may be unlocked by the command issued by a remote cloud authentication and sent to devices (PCS) controlling some of station taps where a guest is redeeming a purchase Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
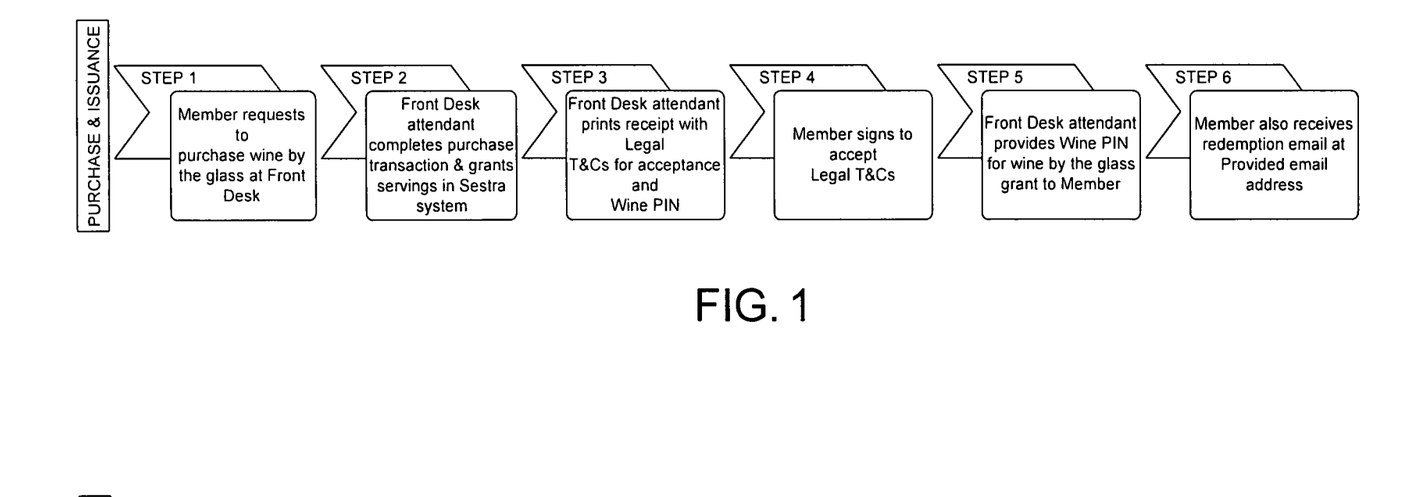
FIG. 1 is a process flow diagram for a purchase and issuance of controlled self dispensing, metering and reporting of beverages from a bulk beverage delivery system.

Referring now to the drawings, wherein like reference numerals indicate the same parts throughout the several views, system and method for the controlled self dispensing of individual beverages is provided. Referring to FIG. 1, the purchase, grants and redemption of a beverage by the glass are described. Redemption systems may be made at a dispensing station interface, or via email or similar messaging delivery. The delivered message may contain a link to the web page that guest opens in a browser on their phones. This web page is specific to the servings grant assigned to that guest. If guest has servings remaining and allowed to redeem at that time (based on the rules engine) they can click on a button on this web page and unlock the taps corresponding to a desired beverage To begin purchase and issuance, members request a purchase (STEP 1) from a controlled facilitator (i.e., service desk at a hotel, attendant at club, etc.). At that point the attendant m ay complete the transaction, whether by sale or as a complimentary perk, and thereby grants automated access to a predetermined number of servings (STEP 2). Grants can be issued not only in the form of number of servings but also as volume (e.g. 48 oz.) or amount ($20). Further, grants can be recurring, e.g. 2 servings per day (i.e., Mon-Thu., etc.) Guest can have both complimentary recurring (e.g. 24 oz of beer per day) and prepaid grants (e.g. 7 glasses of wine) at the same time The purchase is (accompanied with a receipt (STEP 3), either printed or electronic, which provides the recipient with legal terms and conditions as well as an access code (e.g., purchase identification number or PIN). In order to activate access a user may sign and accept the legal terms and conditions (STEP4), after which the access PIN is activated for by the glass automated dispensing to the user (STEP 5). The user may also receive redemption activation via email or electronic messaging (STEP 6).

Figure 2:
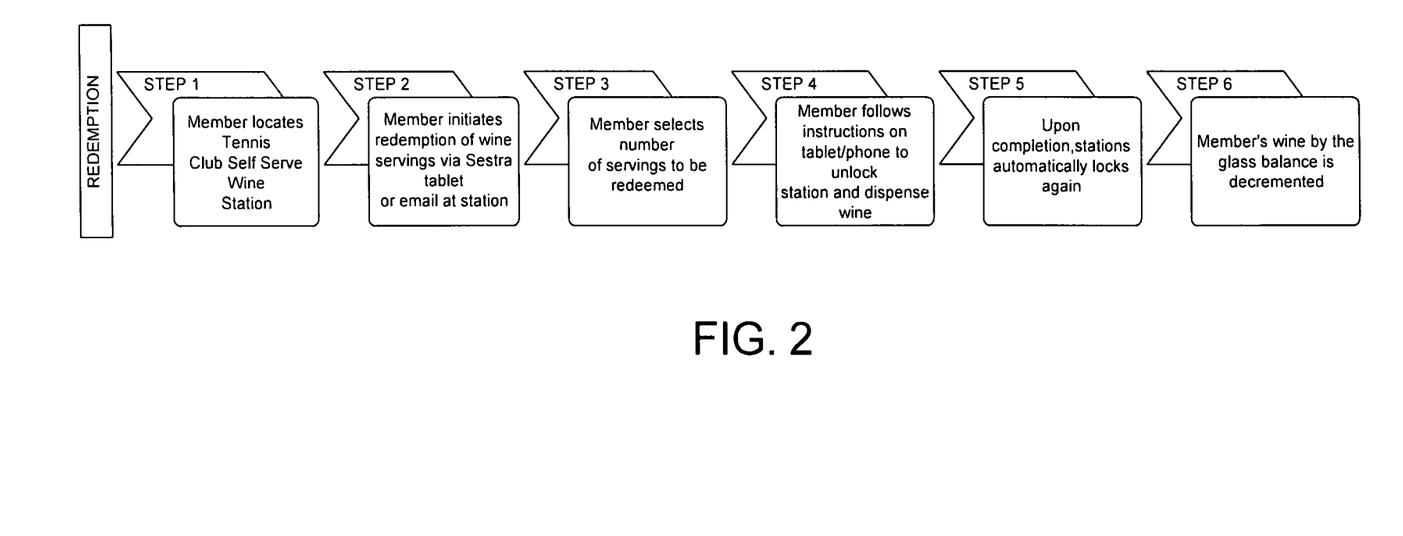
FIG. 2 is a process flow diagram for subsequent redemption from the self dispensing delivery system.

Referring to FIG. 2, user redemption from the self dispensing delivery system is described where the user locates a self serve beverage dispensing station (STEP1) and initiates redemption (STEP2) via an electronic interface with the system. The user selects a number of servings to be redeemed (STEP3) and following instruction on the interface to unlock either the station or selected taps and dispense the beverage (STEP 4). Upon completion of the beverage serving dispensing, the station automatically locks (STEP 5). After dispensing, the users allocation balance is decremented accordingly (STEP 6).

Figure 3:
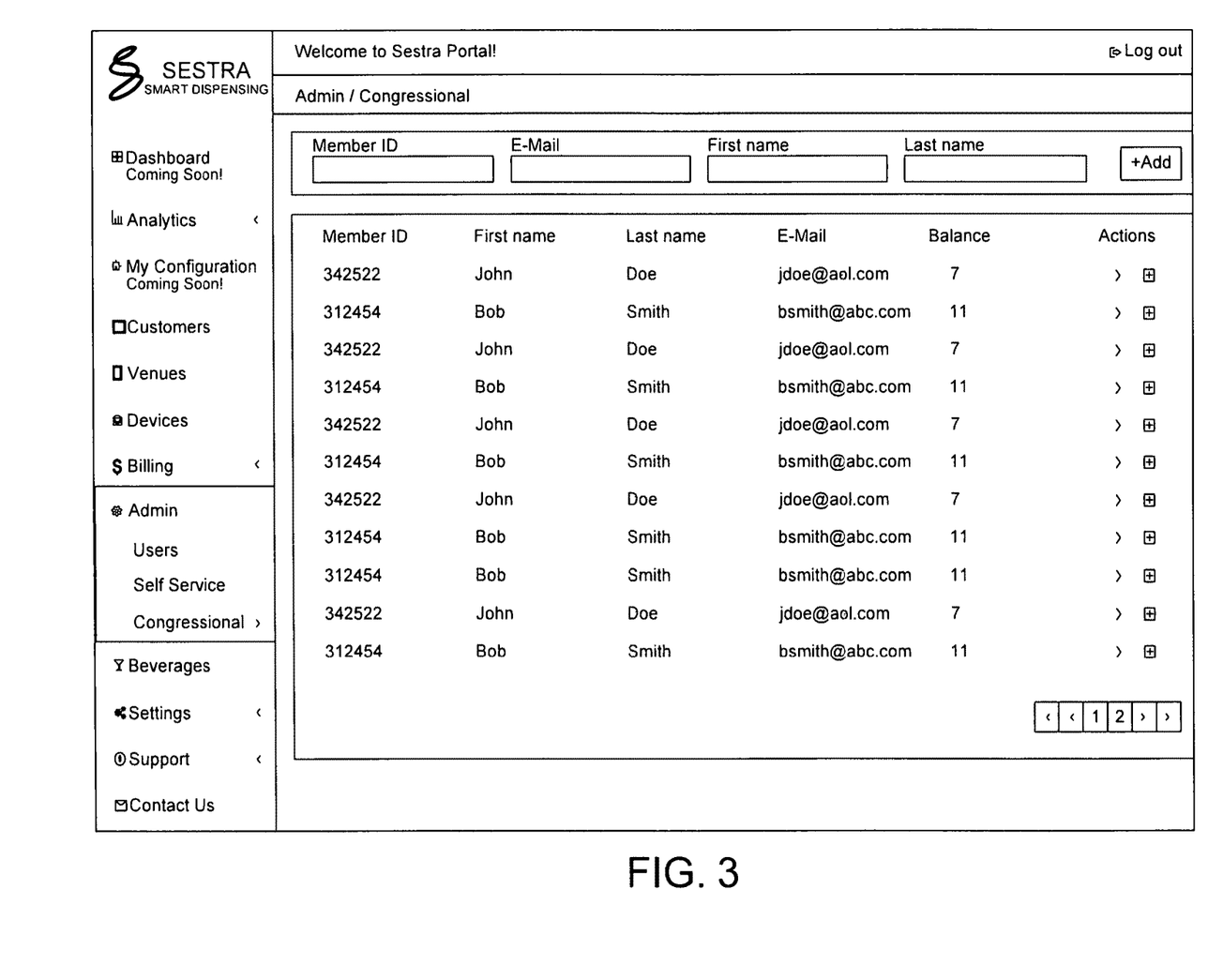
FIG. 3 depicts an exemplary portal page for administrative control of self dispensing beverage delivery.

Referring to FIG. 3, an exemplary portal page is shown that includes an administrative interface for member management and serving grants. Alternate administrative interface may be provided to customized for individual customers. An "add" button 30 allows for adding new users 32. A typical filter may be provided for easy searching for existing users. A user's allowance 34 may thereby be access or changed.

Figure 4:
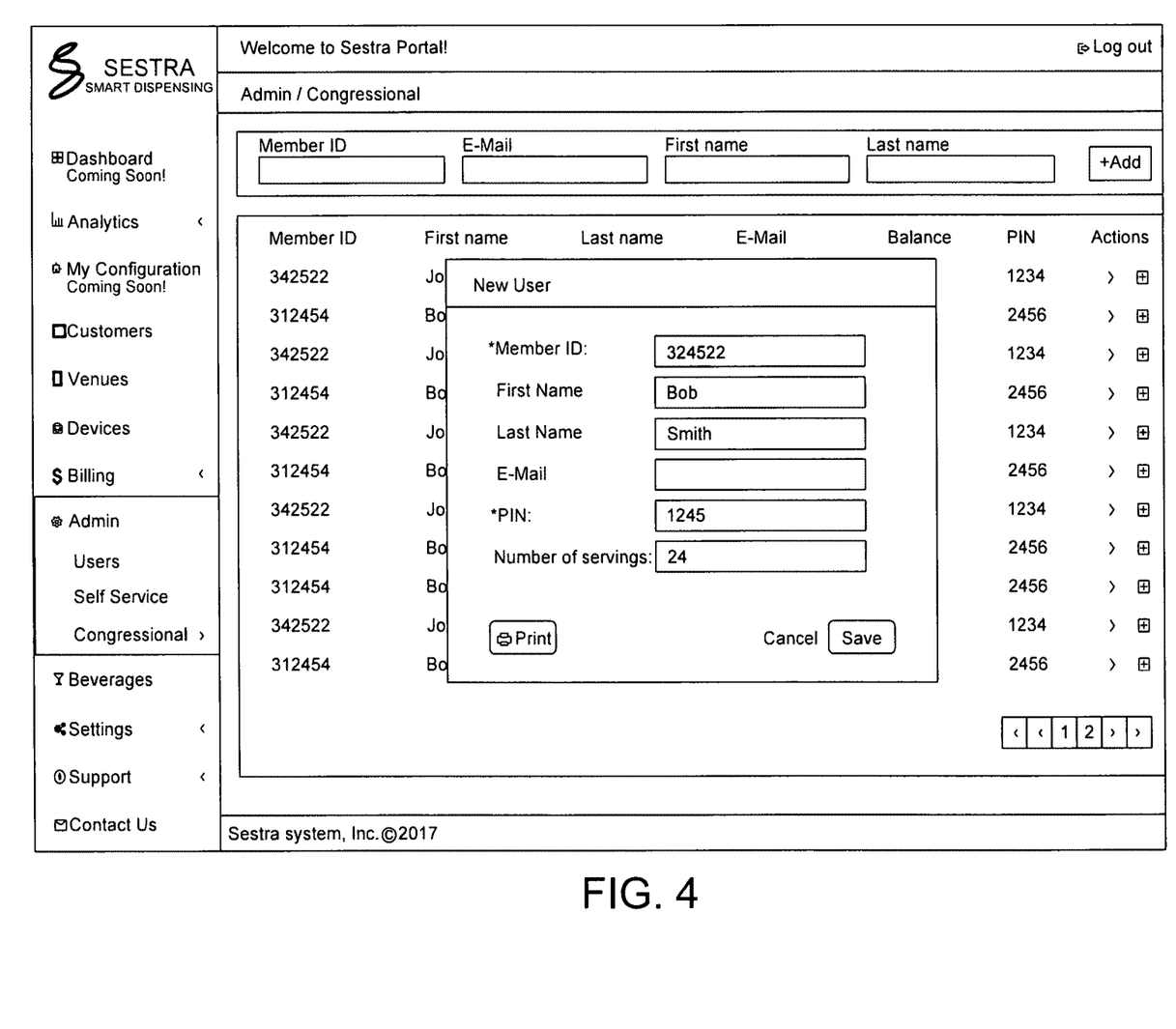
FIG. 4 depicts an exemplary member management portal.

Referring now to FIG. 4, an exemplary member management portal is shown. User access field may include member ID 40, including first name 42 and last name 44, and email address 46. An access PIN 48 may be automatically generated. Servings allocations 50 may be granted at the same time as new member creation.

Figure 5:
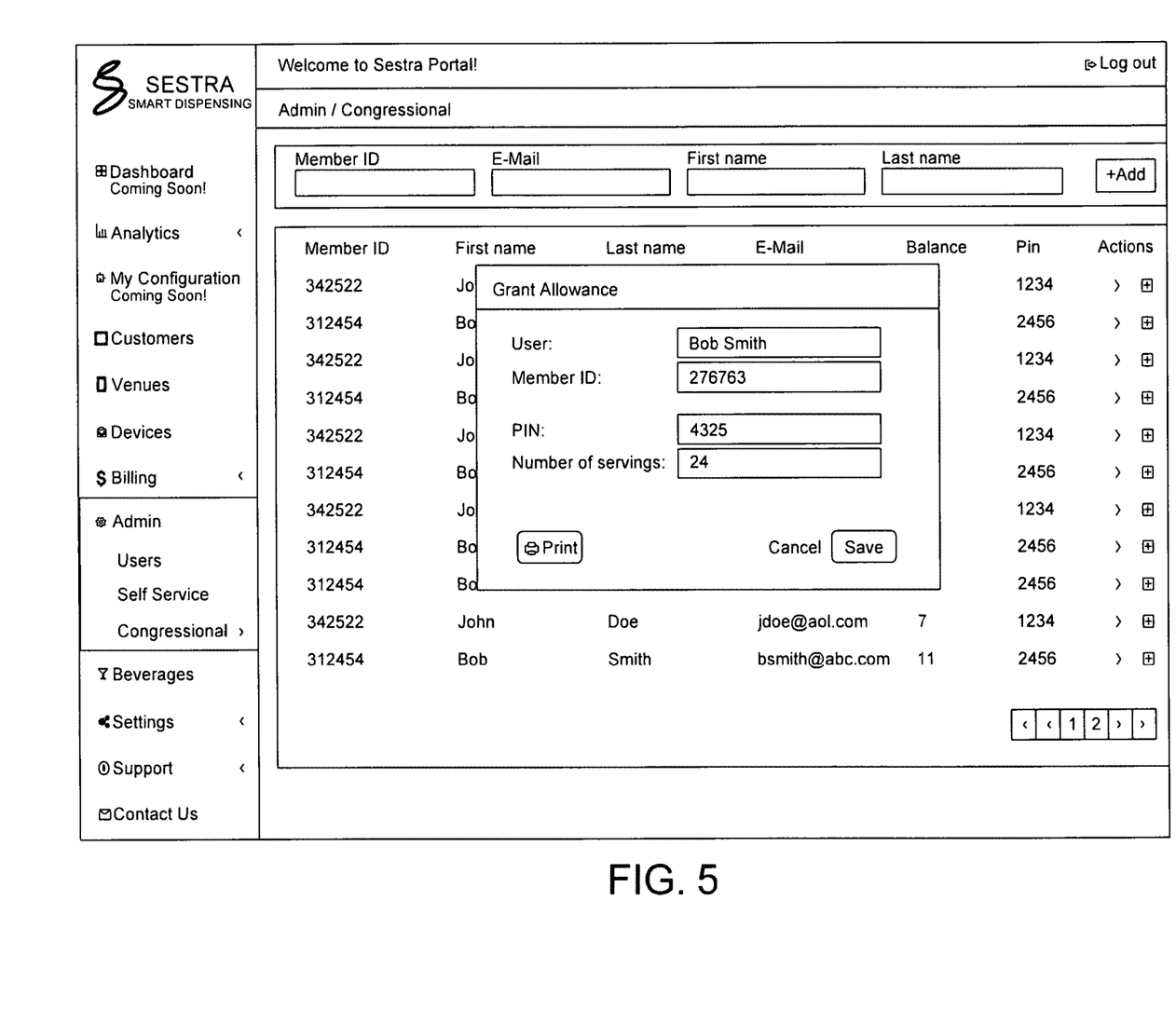
FIG. 5 depicts exemplary interface for serving grant allowances.
Figure 7:
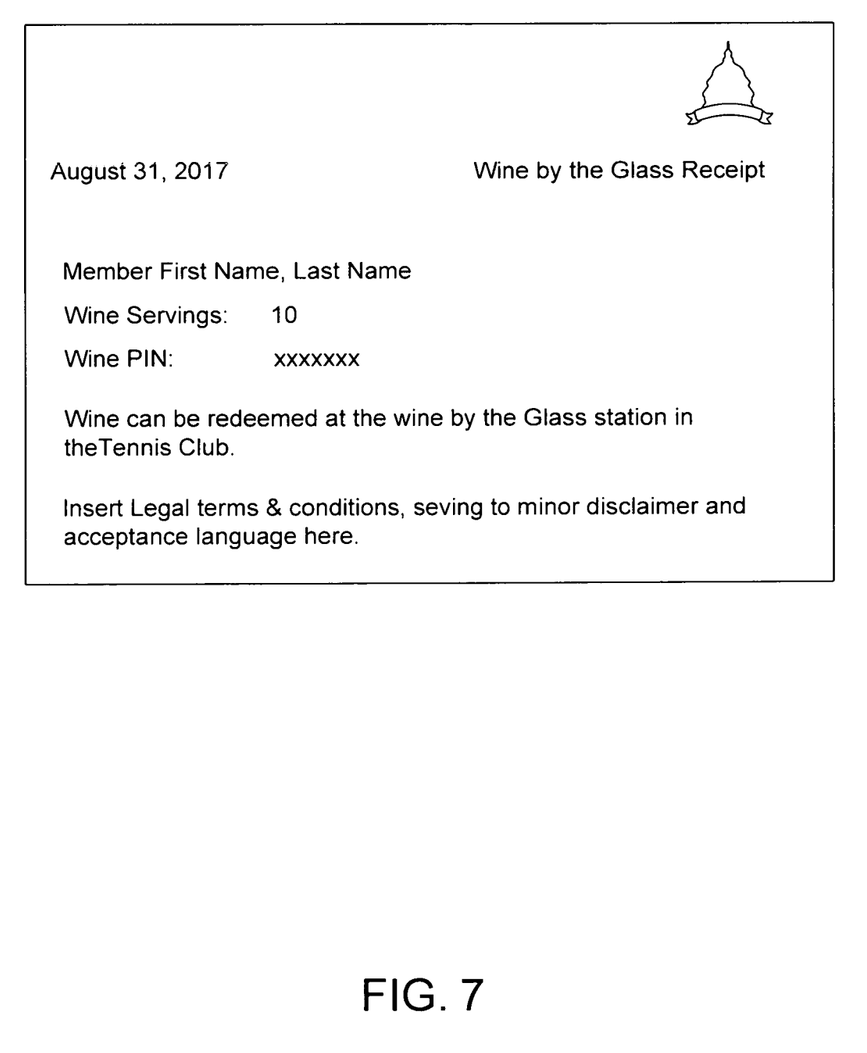
FIG. 7 depict an exemplary receipt.

FIG. 5 shows an exemplary interface for serving grant allowances. Existing users may be searched and the number of servings 50 identified or modified. Upon saving of a new grant, a print button 52 may enable the printing of two copies of a receipt (shown in FIG. 7) with the PIN and legal terms and conditions 70.

Figure 6:
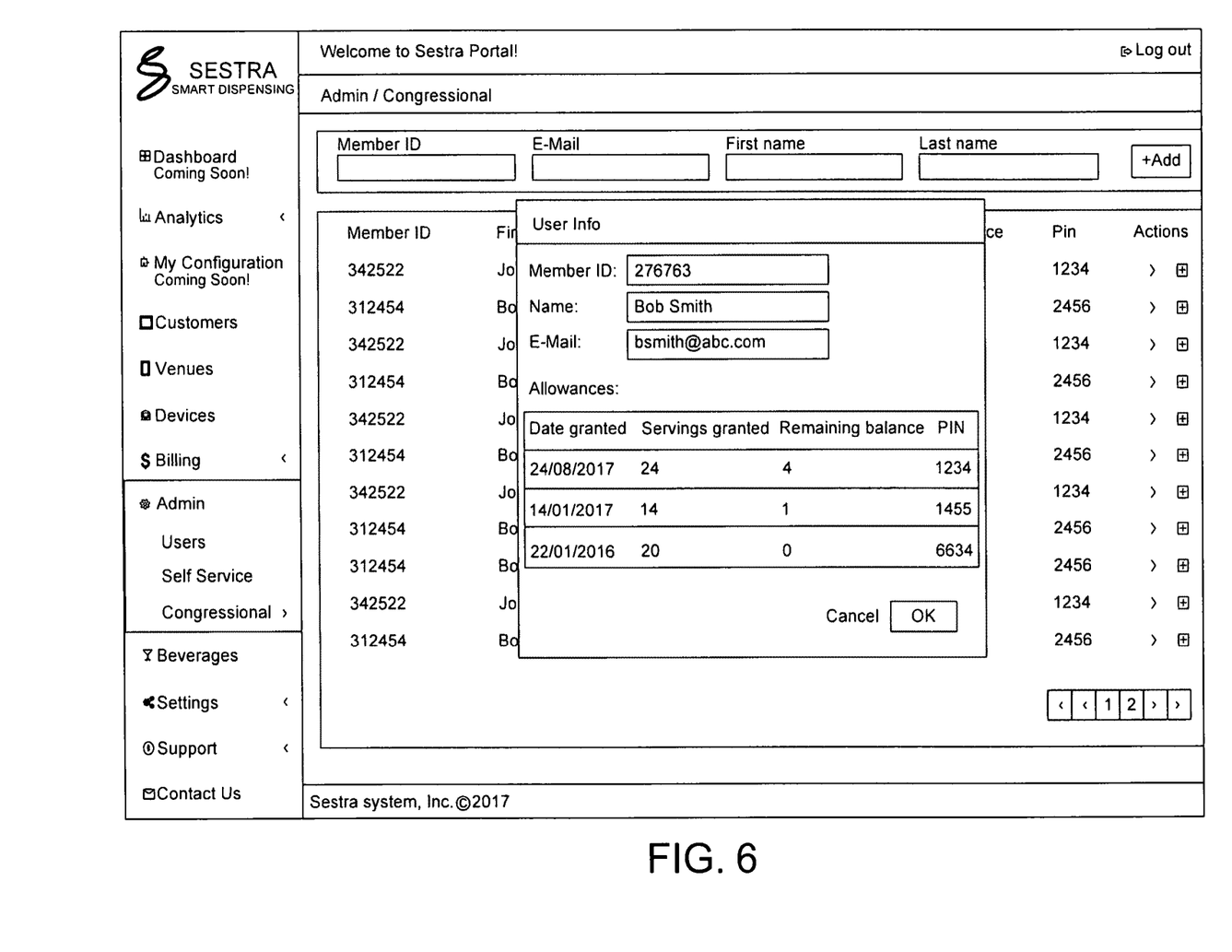
FIG. 6 depicts an exemplary member grant history.

FIG. 6 shows a member grant history where user grants, balances grant date, initial servings, serving balance and PIN may be accessed. A user may also have the ability to cancel a grant for any reason.

Figure 8:
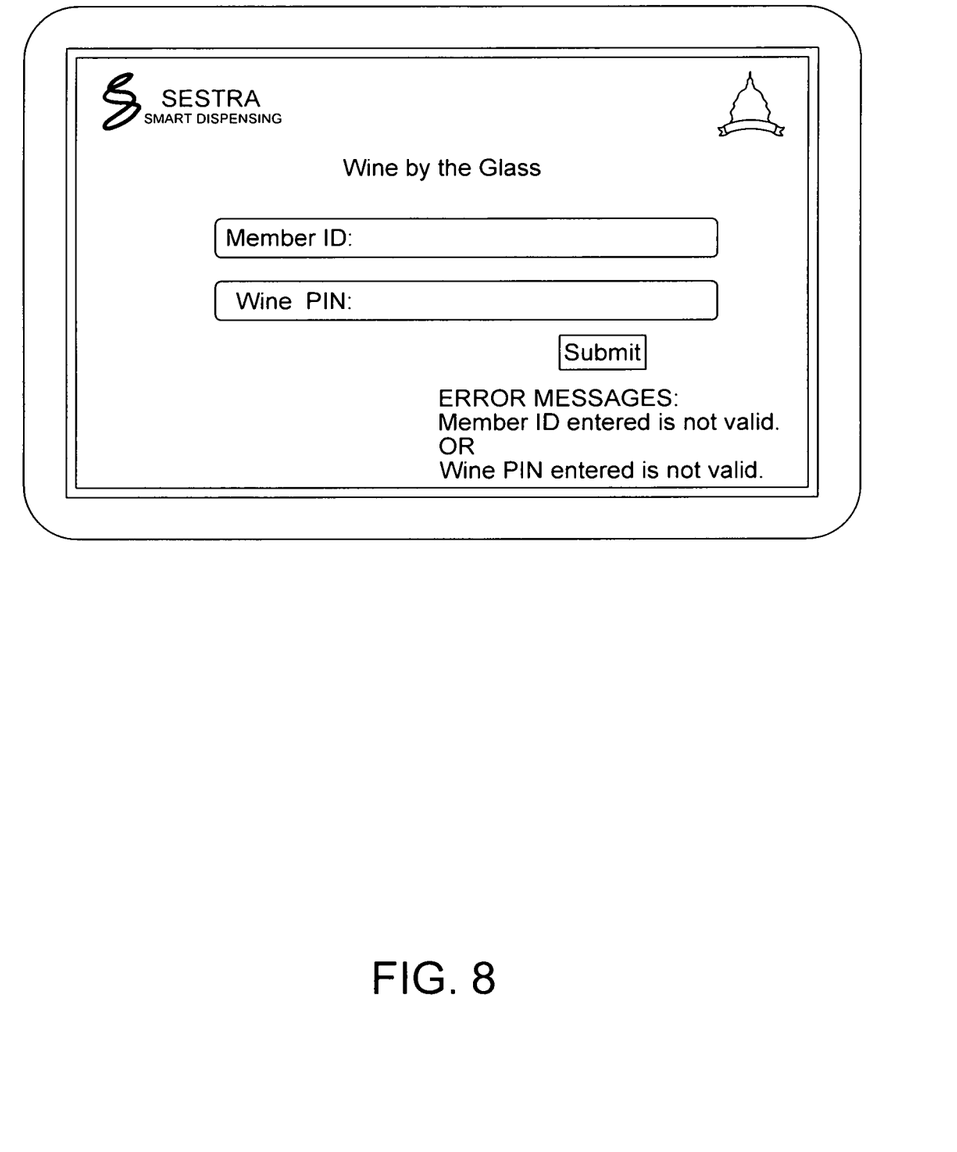
FIG. 8 depicts an exemplary redemption log interface.
Figure 9:
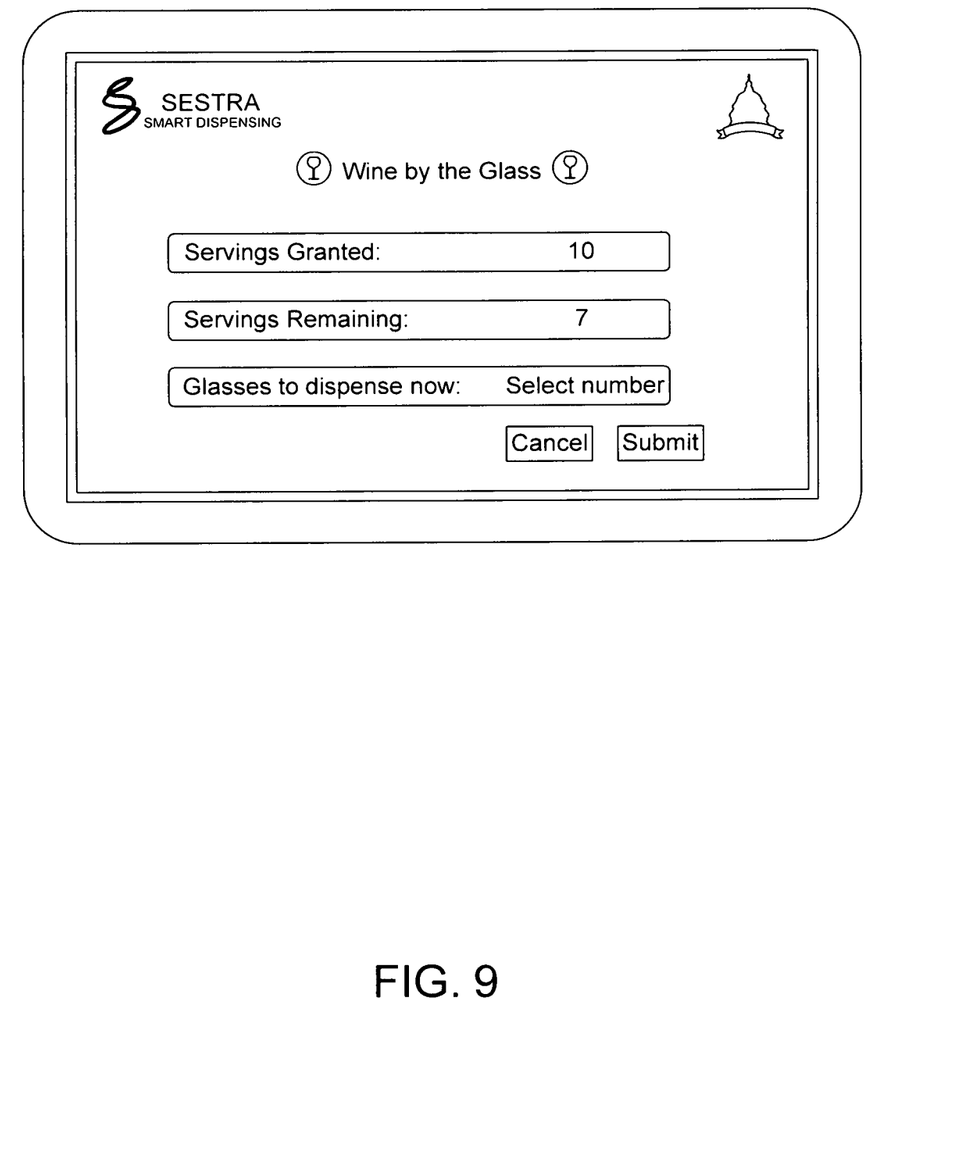
FIG. 9 depicts the redemption log interface being accessed.

FIG. 8 depicts an exemplary redemption log in interface allowing for entry of credentials to enable beverage redemption. The redemption display (FIG. 9) provides a user with balance information, redemption indicator 90 and the ability to cancel or submit such redemptions.

Figure 10:
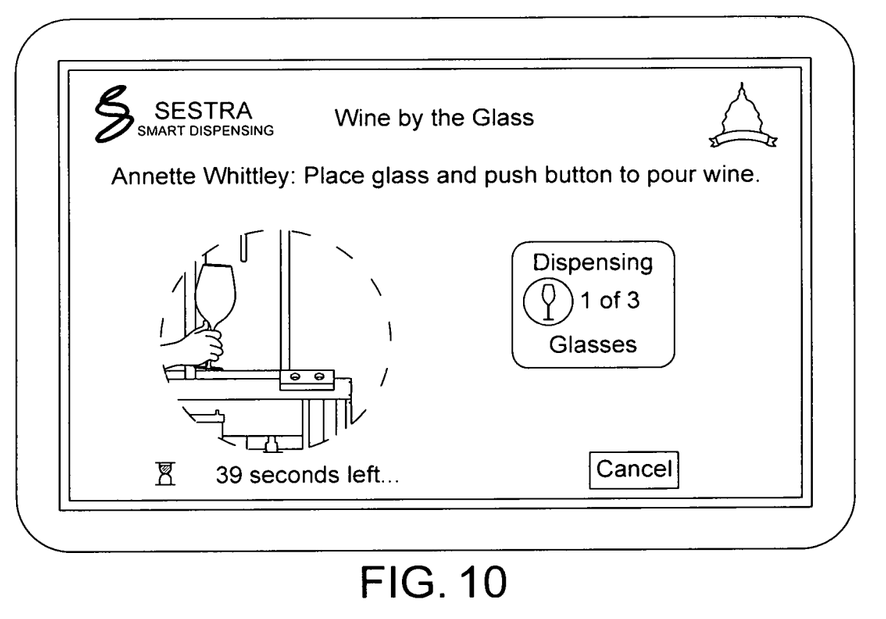
FIG. 10 depicts exemplary user dispensing instructions.
Figure 11:
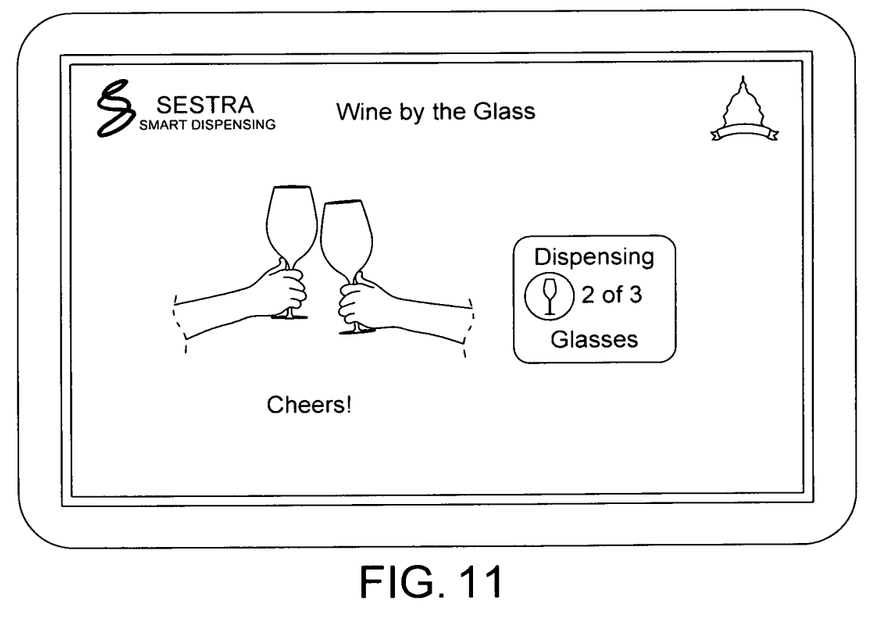
FIG. 11 depicts the user dispensing instruction when dispensing has been completed.

FIG. 10 depicts user dispensing instructions allowing access to videos 100 showing operation of a user placing a glass and pushing a dispensing button. A timer 102 shows the dispensing time remaining, and once dispensing has been completed (FIG. 11) the user balance 104 is decremented.

Figure 12:
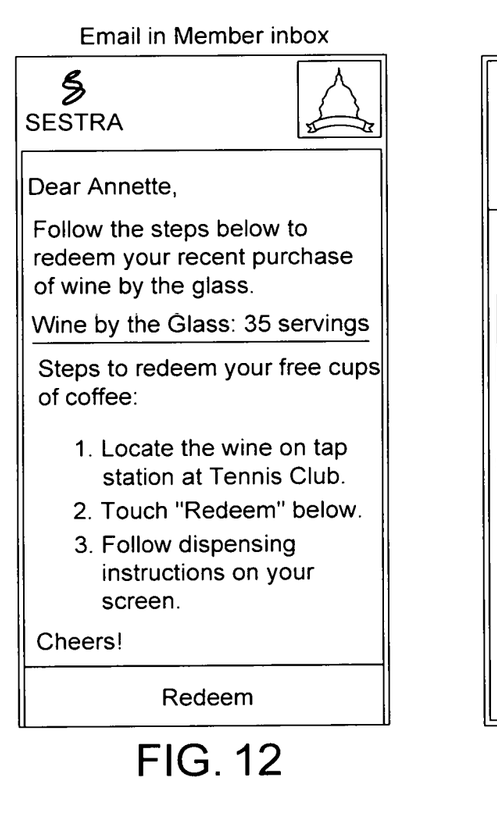
FIG. 12 depicts an exemplary first alternate redemption by email.
Figure 13:
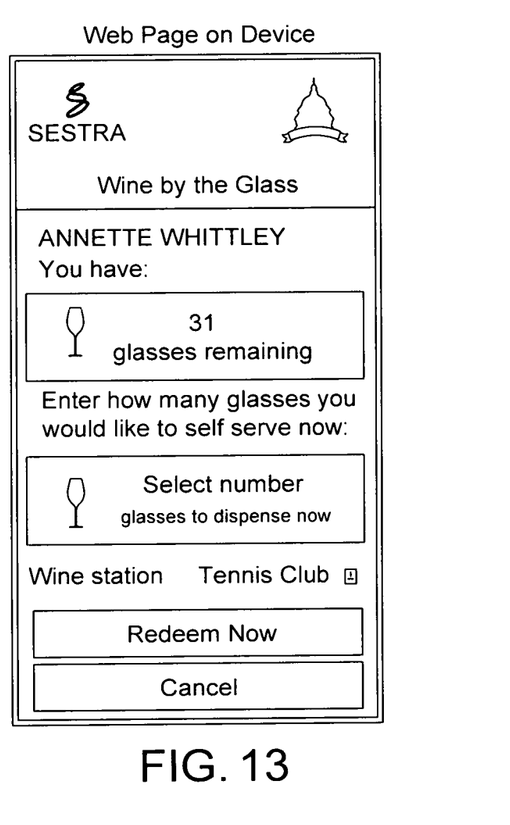
FIG. 13 depicts an exemplary website access for such alternate redemption.

FIG. 12 and FIG. 13 depict an alternate electronic redemption where an email 120 may be forwarded to a member's provided email when access is initiated. When the user activates a redemption 122 a web page 130 may be accessed to provide a similar user interface.

2. Operation of the Preferred Embodiment

Figure 14:
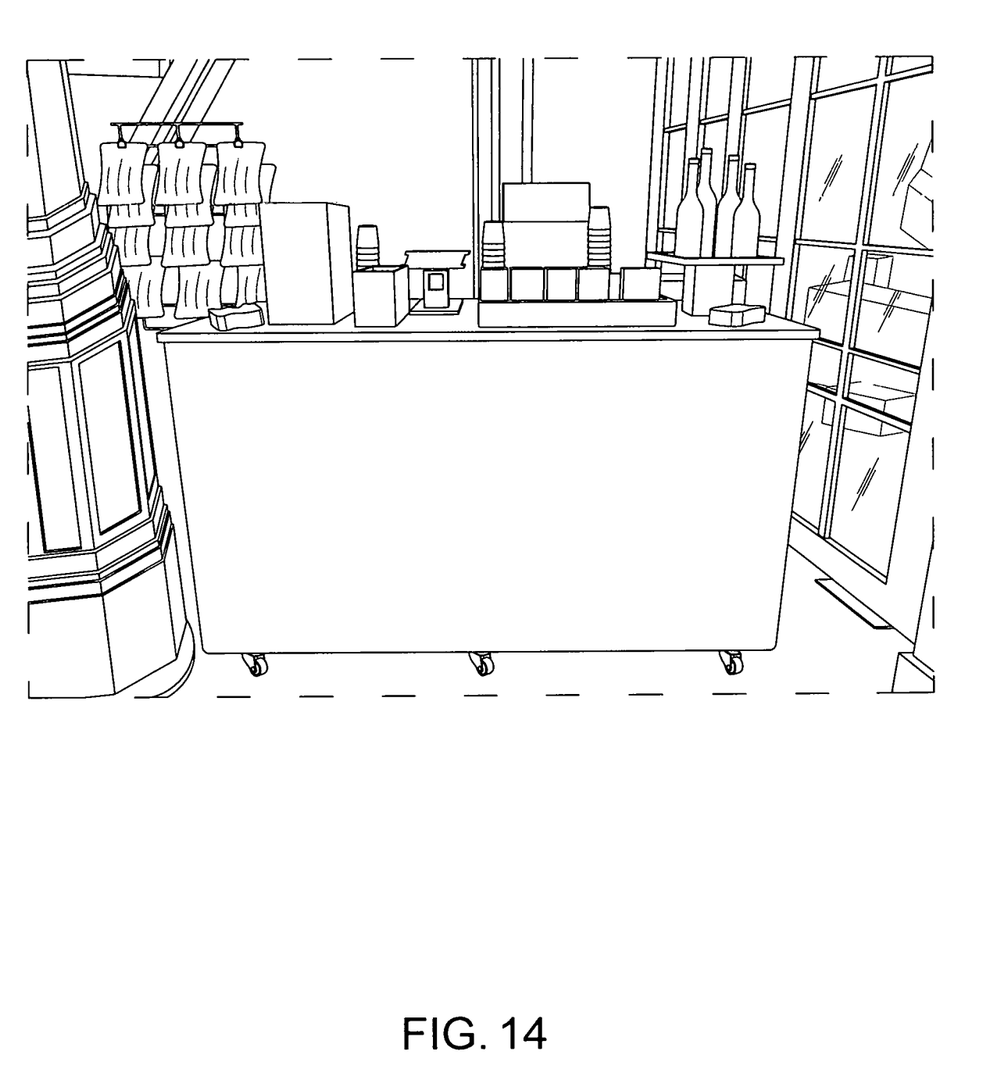
FIG. 14 shows a typical self dispensing system for the automated metering and reporting of beverages from a bulk beverage delivery system.

As shown in conjunction with FIG. 14, in operation a self dispensing system may be automated for the access, metering and reporting of beverages from a bulk beverage delivery system 140. In use a facility may offer customers or members the ability to self serve beverages by the glass with servings being pre-purchased by or given to users. Access may be conditioned upon acceptance of legal terms, conditions or disclaimers, with PIN access being conditioned on such acceptance. Redemption may be accomplished by entry of the PIN at the dispensing station 140, or may be accomplished electronically via website that can be accessed from the email. Redemptions may also be initiated by guest scanning their QR/bar code printed on their ticket/invitation by scanning a magnetic card (e.g. room key) on RFID reader.

Controlled self dispensing is thereby user initiated with prepayment or pre-access, with the beverage tap remaining locked after each dispensing until another user access the subsequent dispensing. Portion control and access control may thereby be safely maintained in an automated manner so as to eliminate the need of a bartender or similar staff attendant. Users dispensing analytics and system analytics may thereby be automatically tabulated and may include a record of each pour, location, quantity, number of servings, beverage type, member purchase details as well as day/date/time information for each activation. Failed pours may also be tracked to identify the reason for failure (out of schedule, exceeded allocation, expired card, empty keg, etc)

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A method of operating the dispensing and pour control system for a regulated beverage, the dispensing and pour control system comprising:
    a bulk storage and distribution system for a pressurized beverage;
    a metering mechanism in fluid communication with a beverage supply in operative connection with said bulk storage and distribution system, said metering system for providing a specific selected volumetric discharge in fluid communication with a tap or spigot in a manner that provides for said beverage to be discharged in a controlled and metered manner into a drinking container that is coordinated with the beverage being discharged;
    a controller in operational communication with said metering mechanism; and
    an electronic interface for accessing and initiating said controller having:
        a purchase or grant of one or more single servings of an alcoholic beverage and a redemption of said one or more single servings from an automated dispensing tap in fluid communication with said metering mechanism; and
        an electronic user interface at a dispensing station interface or via a networked application interface;
    wherein the method comprising the steps:
        allocating the purchase or grant from a controlled facilitator;
        granting automated access to a predetermined number of servings from the purchase or grant;
    authenticating the granting of automated access via a receipt comprising legal terms and conditions and an access code;

activating the automated dispensing tap by communicating the access code to the dispensing station interface or networked application interface; and dispensing a number of individual servings of the alcoholic beverage from the predetermined number of servings through the automated dispensing tap.

2. The method of claim 1, wherein after the dispensing further comprising:

automatically locking the automated dispensing tap; and updating and decrementing balances of the grant.

3. The method of claim 2, further comprising:

creating dispensing analytics; and communicating the dispensing analytics to a user or system administrator.

4. The method of claim 3, wherein said dispensing analytics are selected from a group comprising: record of each pour; location of each pour; quantity of beverage dispensed; number of servings; beverage type; member purchase details; and day/date/time information for each activation.

5. The method of claim 3, further comprising a rules engine for allowing the specification of limitations to be satisfied before dispensing is allowed.

6. The method of claim 5, wherein the limitation are selected from a group consisting of: a venue level limitation; or a guest level limitation.

7. The method of claim 4, wherein a progress of dispensing may be tracked from a remote cellular phone.

8. The method of claim 4, wherein a progress of dispensing may be tracked from an interfaced installed near an RFID/QR/CC reader.

* * * * *